United States Patent
Houmura et al.

(10) Patent No.: US 8,588,857 B2
(45) Date of Patent: Nov. 19, 2013

(54) COMMUNICATION TERMINAL, AND DIAL REGISTRATION METHOD AND DIAL REGISTRATION PROGRAM THEREFOR

(75) Inventors: Toshikazu Houmura, Kawasaki (JP); Kazuhiro Yoshihara, Yokohama (JP); Takako Yamaguchi, Yokohama (JP); Kazuma Nagaoka, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 1847 days.

(21) Appl. No.: 11/538,643

(22) Filed: Oct. 4, 2006

(65) Prior Publication Data

US 2007/0123232 A1      May 31, 2007

Related U.S. Application Data

(63) Continuation of application No. 10/998,036, filed on Nov. 29, 2004, now Pat. No. 8,019,061.

(30) Foreign Application Priority Data

Aug. 18, 2004  (JP) ................................. 2004-238520

(51) Int. Cl.
*H04M 1/00* (2006.01)

(52) U.S. Cl.
CPC ...................................... *H04M 1/00* (2013.01)
USPC .... 455/564; 455/585; 455/558.2; 379/355.01

(58) Field of Classification Search
USPC ........................... 455/564, 565, 556.1, 556.2; 379/100.14, 90.01, 93.23, 93.17, 379/355.01, 355.02
See application file for complete search history.

(56) References Cited

U.S. PATENT DOCUMENTS

| | | | |
|---|---|---|---|
| 5,941,930 A | 8/1999 | Morimoto et al. | |
| 7,020,269 B1 | 3/2006 | Park et al. | |
| 7,123,713 B2 | 10/2006 | Isozaki | |

FOREIGN PATENT DOCUMENTS

| | | |
|---|---|---|
| CN | 2337723 | 9/1999 |
| CN | 1317919 | 10/2001 |

(Continued)

OTHER PUBLICATIONS

NTT Docomo; FOMA SH902iSL DOCLE SL "User Guide", Jul. 7, 2006, p. 150, paragraph 2.

(Continued)

*Primary Examiner* — Melur Ramakrishnaiah
(74) *Attorney, Agent, or Firm* — Staas & Halsey LLP

(57) ABSTRACT

A communication terminal having one or more one-touch-dial buttons simplifies operations needed for registration of destination data such as phone numbers or mail addresses. A communication terminal (e.g., a cellular phone) having one or more one-touch-dial buttons includes a destination-data registration unit (e.g., a phone-directory database) that allows destination data such as phone numbers or mail addresses to be registered therein, a one-touch-dial registration unit that allows destination data to be registered therein so as to be associated with the one or more one-touch-dial buttons, and a control unit that, in response to an operation of the one or more one-touch-dial buttons, determines whether destination data has been registered in the one-touch-dial registration unit or the destination-data registration unit, and that outputs a result of the determination and a query message regarding registration of the destination data.

4 Claims, 12 Drawing Sheets

(56) References Cited

FOREIGN PATENT DOCUMENTS

| JP | 61-140299 | | 6/1986 |
|---|---|---|---|
| JP | 62-71361 | | 4/1987 |
| JP | 63-129759 | | 6/1988 |
| JP | 06-208432 | | 7/1994 |
| JP | 7-143219 | | 6/1995 |
| JP | 7-177257 | | 7/1995 |
| JP | 8-223269 | | 8/1996 |
| JP | 2000174883 | | 6/2000 |
| JP | 2001-069204 | | 3/2001 |
| JP | 2003-333162 | | 11/2003 |
| JP | 2004-040416 | | 2/2004 |
| JP | 2004-147136 | | 5/2004 |
| JP | 2004147136 A * | | 5/2004 |
| JP | 2004-187059 | | 7/2004 |
| KR | 2001-0010295 | | 2/2001 |
| KR | 1020020093423 | | 12/2002 |
| KR | 10-0608828 | | 8/2006 |

OTHER PUBLICATIONS

NTT Docomo; FOMA SH851i DOLCE "User Guide", Aug. 5, 2005, p. 406, paragraph 2.
Korean Office Action, dated Nov. 16, 2006, and issued in corresponding Korean Divisional Application No. 10-2006-0081261.
Korean Office Action, dated Oct. 31, 2006, and issued in corresponding Korean Divisional Application No. 10-2006-0081268.
Korean Office Action, dated Nov. 16, 2006, and issued in corresponding Korean Divisional Application No. 10-2006-0081277.
U.S. Office Action issued on Nov. 13, 2008 in parent U.S. Appl. No. 10/998,036.
Japanese Office Action issued on Nov. 4, 2008 in Japanese Patent Application No. 2006-268331, which corresponds to U.S. Appl. No. 11/538,668.
Japanese Office Action issued on Nov. 4, 2008 in corresponding Japanese Patent Application No. 2006-368330.
Japanese Office Action issued on Nov. 4, 2008 in Japanese Patent Application No. 2004-238520, which corresponds to U.S. Appl. No. 10/998,036.
Chinese Office Action issued on Jul. 11, 2008 in Chinese Patent Application No. 200610150383.6, which corresponds to U.S. Appl. No. 11/538,668.
Chinese Office Action issued on Jul. 11, 2008 in corresponding Chinese Patent Application No. 200610150384.0.
Office Action issue in corresponding Chinese Patent Application No. 2004100916813, Dec. 21, 2007.
Office Action mailed May 14, 2009 for co-pending U.S. Appl. No. 10/998,036.
Office Action issued Apr. 23, 2008 in U.S. Appl. No. 10/998,036.
Office Action dated Nov. 16, 2006 and issued in corresponding Korean Patent Application No. 10-2006-0081261.
Office Action dated Oct. 31, 2006 and issued in corresponding Korean Patent Application No. 10-2006-0081268.
Office Action dated Nov. 16, 2006 and issued in corresponding Korean Patent Application No. 10-2006-0081277.
Office Action dated Apr. 27, 2006 and issued in corresponding Korean Patent Application No. 10-2004-0099416.
Office Action issued Dec. 21, 2007 in corresponding Chinese Patent Application No. 2004100916813.
U.S. Appl. No. 10/998,036, filed Nov. 29, 2004, Houmura et al., Fujitsu Limited.
Office Action for corresponding Korean Application No. 10-2004-0099416dated Apr. 27, 2006.
Office Action issued in corresponding Korean Patent Application No. 10-2006-0081277, on May 31, 2007.
Japanese Office Action dated Oct. 13, 2009, issued in corresponding Japanese Office Action 2006-268330.
Japanese Office Action dated Oct. 13, 2009, issued in corresponding Japanese Office Action 2004-238520.
Japanese Office Action dated Oct. 13, 2009, issued in corresponding Japanese Office Action 2006-268331.
Office Action mailed Dec. 1, 2009 for co-pending U.S. Appl. No. 10/998,036.
Office Action mailed Jan. 28, 2010 for co-pending U.S. Appl. No. 11/538,668.
Partial English Translation of Japanese 2004-187059, publication date Jul. 2, 2004.
Partial English Translation of Japanese 2003-333162, publication date Nov. 21, 2003.
Japanese Office Action issued Mar. 9, 2010 in corresponding Japanese Patent Application 2004-238520.
Japanese Office Action issued Mar. 9, 2010 in corresponding Japanese Patent Application 2004-283233.
Japanese Office Action issued Mar. 9, 2010 in corresponding Japanese Patent Application 2004-283234.
Japanese Office Action issued Mar. 9, 2010 in corresponding Japanese Patent Application 2004-283235.
Chinese Office Action issued Nov. 2, 2010 with respect to Chinese Patent Application No. 200610150384.0.
Chinese Office Action dated Nov. 25, 2010 issued with respect to corresponding Chinese patent application No. 200610150383.6.
Notice of Allowance and Fee(s) issued May 29, 2012 for U.S. Appl. No. 12/714,813.
Third Chinese Office Action issued Apr. 11, 2011 in co-pending Chinese Application No. 200610150384.0.
Third Chinese Office Action issued May 3, 2011 in co-pending Chinese Application No. 200610150383.6.
U.S. Notice of Allowance issued Jun. 21, 2011 in parent U.S. Appl. No. 10/998,036.
Supplemental Notice of Allowability mailed Jun. 24, 2010 in corresponding U.S. Appl. No. 10/998,036.
U.S. Appl. No. 10/998,036, filed Nov. 29, 2004, Toshikazu Houmura et al., Fujitsu Limited.
U.S. Appl. No. 11/538,668, filed Oct. 4, 2006, Toshikazu Houmura et al., Fujitsu Limited.
Notice of Allowance mailed Aug. 16, 2010 in corresponding U.S. Appl. No. 11/538,668.
Notice of Allowance mailed Aug. 26, 2010 in co-pending U.S. Appl. No. 10/998,036.
Office Action issued Oct. 28, 2011 in related U.S. Appl. No. 12/714,813.
Office Action issued Jul. 26, 2013 in corresponding U.S. Appl. No. 11/538,668.

* cited by examiner

TRANSITION TO IDLE SCREEN

COMMUNICATION TERMINAL, AND DIAL REGISTRATION METHOD AND DIAL REGISTRATION PROGRAM THEREFOR

CROSS REFERENCE TO RELATED APPLICATIONS

This application is a Continuation Application of Ser. No. 10/998,036 entitled "Communication Terminal, and Dial Registration Method and Dial Registration Program Therefor", by Toshikazu Houmura et al., filed Nov. 29, 2004, now U.S. Pat. No. 8,019,061, the entire contents of which is incorporated by reference herein.

This application is also related to U.S. application Ser. No. 11/538,668, entitled "Communication Terminal, and Dial Registration Method And Dial Registration Program Therefor", Toshikazu Houmura et al., filed concurrently herewith, the entire contents of which is incorporated by reference herein.

BACKGROUND OF THE INVENTION

1. Field of the Invention

The present invention relates to controlling registration of a one-touch dial in a communication terminal such as a cellular phone. More specifically, the present invention relates to a communication terminal that allows a phone number to be registered in response to an operation of a one-touch-dial button, and to a dial registration method and a dial registration program for such a communication terminal.

2. Description of the Related Art

In a known type of communication terminal such as a cellular phone, a one-touch-dial button is provided separately from dial buttons for inputting a phone number so that by pressing the one-touch-dial button it is possible to call the phone number associated with the button which pressed. Even though provided with such on one-touch-dial button, if a phone number is not yet registered, when the one-touch-dial button is pressed by a user, the user is notified that a phone number is not yet registered. Then, the screen returns to an idle screen, and the user has to register a dial from a menu mode.

Regarding the use of such a one-touch-dial button, Japanese Unexamined Patent Application Publication No. 2004-147136 discloses a method for registering, as a one-touch dial, a phone number that is input when making a call. The registration method requires input of a phone number, so that registration is not allowed if the phone number is not stored at the time of registration.

When a phone number is registered so as to be associated with a one-touch-dial button, a phone number is first registered in a phone-directory database, and then operation is started again from a menu to register the phone number in relation to the one-touch-dial button. This is inconvenient for a user since the user has to operate buttons many times so that the operations for registration are complex even though the one-touch-dial button is provided.

Furthermore, even when a one-touch-dial button is provided, if it is required to input a phone number or a mail address, it is not possible to register a phone number or a mail address when the phone number or the mail address are not stored or when the user is not allowed to instantly refer to the phone number or the mail address.

These problems or measures for solving these problems are not disclosed or suggested in Japanese Unexamined Patent Application Publication No. 2004-147136.

SUMMARY OF THE INVENTION

In view of the problems described above, it is an object of the present invention to provide a communication terminal having one or more one-touch-dial buttons, in which operations needed for registration of destination data such as a phone number or a mail address are simplified.

To this end, according to an aspect of the present invention, a communication terminal having one or more one-touch-dial buttons is provided. The communication terminal includes a destination-data registration unit that allows destination data to be registered therein; a one-touch-dial registration unit that allows destination data to be registered therein so as to be associated with the one or more one-touch-dial buttons; and a control unit that, in response to an operation of the one or more one-touch-dial buttons, determines whether destination data has been registered in the one-touch-dial registration unit or the destination-data registration unit, and that outputs a result of the determination and a query message regarding registration of the destination data. In the communication terminal, destination data refers to information that serves to identify a destination of communication, such as a phone number or a mail address.

Accordingly, destination data such as a phone number is registered in the destination-data registration unit, and destination data such as a phone number is registered in the one-touch-dial registration unit so as to be associated with a one-touch-dial button. In response to an operation of a one-touch-dial button, the control unit determines whether destination data has been registered in relation to the one-touch-dial button. As a result of this determination, the control unit outputs a result of the determination and a query message regarding registration of the destination data. Based on these outputs, by the operation of the one-touch-dial button, a user is allowed to check whether destination data has been registered, and to determine whether or not to register destination data based on the query message.

The communication terminal may further include a display that displays a screen showing status of processing, so that the display, in response to the output of the result of the determination and the query message, displays a screen showing selection information together with the result of the determination and the query message.

Accordingly, in response to an operation of the one or more one-touch-dial buttons, after it is determined whether destination data has been registered, the display presents a screen showing selection information together with a query message regarding registration of the destination data such as a phone number. Based on the message, the user is allowed to select, for example, registration from the selection information, input desired destination data such as a phone number, and readily register the destination data in relation to the one-touch-dial button.

According to another aspect of the present invention, a communication terminal having one or more one-touch-dial buttons is provided. The communication terminal includes a destination-data registration unit that allows destination data to be registered therein; a one-touch-dial registration unit that allows destination data to be registered therein so as to be associated with the one or more one-touch-dial buttons; and a control unit that, in response to an operation of the one or more one-touch-dial buttons, allows newly input destination data to be registered in the destination-data registration unit in a case where destination data has not been registered in the one-touch-dial registration unit and the destination-data registration unit.

Accordingly, it is possible to check by an operation of the one or more one-touch-dial buttons whether destination data such as a phone number has not been registered. When destination data has not been registered, it is possible to register destination data in the destination-data registration unit without transition from processing for the operation of the one-touch-dial button to other processing. Based on this registration, it is possible to register the destination data in relation to the one-touch-dial button without transition to other processing. Thus, destination data can be registered so as to be associated with the one or more one-touch-dial buttons by a smaller number of operations.

According to another aspect of the present invention, a communication terminal having one or more one-touch-dial buttons is provided. The communication terminal includes a destination-data registration unit that allows destination data to be registered therein; a one-touch-dial registration unit that allows destination data to be registered therein so as to be associated with the one or more one-touch-dial buttons; and a control unit that, in response to an operation of the one or more one-touch-dial buttons, allows destination data retrieved from the destination-data registration unit to be registered in the one-touch-dial registration unit in a case where destination data has not been registered in the one-touch-dial registration unit in relation to the one-touch-dial button operated.

Accordingly, it is possible to check by an operation of the one or more one-touch-dial buttons whether destination data such as a phone number has not been registered in the one-touch-dial registration unit in relation to the one-touch-dial button. When destination data has not been registered, it is possible to search the destination-data registration unit without transition from processing for the operation of the one-touch-dial button to other processing. When destination data has been registered in the destination-data registration unit in relation to the one-touch-dial button, the destination data retrieved from the destination-data registration unit can be registered in relation to the one-touch-dial button without transition to other processing. Thus, destination data can be registered so as to be associated with the one or more one-touch-dial buttons by a smaller number of operations.

According to another aspect of the present invention, a dial registration method for a communication terminal having one or more one-touch-dial buttons is provided. The dial registration method includes the steps of registering destination data in a destination-data registration unit; registering destination data in a one-touch-dial registration unit so as to be associated with the one or more one-touch-dial buttons; and in response to an operation of the one or more one-touch-dial buttons, determining whether destination data has been registered in the one-touch-dial registration unit or the destination-data registration unit, and outputting a result of the determination and a query message regarding registration of the destination data. Accordingly, as described earlier with regard to a communication terminal, by the operation of the one-touch-dial button, a user is allowed to check whether destination data has been registered, and to determine whether or not to register destination data based on the query message.

The dial registration method may further include the steps of displaying a screen showing status of processing on a display; and in response to the output of the result of the determination and the query message, displaying on the display a screen showing selection information together with the result of the determination and the query message.

According to another aspect of the present invention, a dial registration method for a communication terminal having one or more one-touch-dial buttons is provided. The dial registration method includes the steps of registering destination data in a destination-data registration unit; registering destination data in a one-touch-dial registration unit so as to be associated with the one or more one-touch-dial buttons; and in response to an operation of the one or more one-touch-dial buttons, allowing newly input destination data to be registered in the destination-data registration unit in a case where destination data has not been registered in the one-touch-dial registration unit and the destination-data registration unit. Accordingly, as described earlier with regard to a communication terminal, it is possible to register destination data so as to be associated with the one or more one-touch-dial buttons without transition to other processing, so that the number of operations needed for registration becomes smaller.

According to another aspect of the present invention, a dial registration method for a communication terminal having one or more one-touch-dial buttons is provided. The dial registration method includes the steps of registering destination data in a destination-data registration unit; registering destination data in a one-touch-dial registration unit so as to be associated with the one or more one-touch-dial buttons; and in response to an operation of the one or more one-touch-dial buttons, allowing destination data retrieved from the destination-data registration unit to be registered in the one-touch-dial registration unit in a case where destination data has not been registered in the one-touch-dial registration unit in relation to the one-touch-dial button operated. Accordingly, as described earlier with regard to a communication terminal, it is possible to retrieve destination data from the destination-data registration unit and to register the destination data so as to be associated with the one or more one-touch-dial buttons without transition to other processing, so that the number of operations needed for registration becomes smaller.

According to another aspect of the present invention, a dial registration program for a communication terminal having one or more one-touch-dial buttons is provided. The dial registration program allows an information processing unit to execute the steps of registering destination data in a destination-data registration unit; registering destination data in a one-touch-dial registration unit so as to be associated with the one or more one-touch-dial buttons; and in response to an operation of the one or more one-touch-dial buttons, determining whether destination data has been registered in the one-touch-dial registration unit or the destination-data registration unit, and outputting a result of the determination and a query message regarding registration of the destination data. Accordingly, as described earlier with regard to a dial registration method for a communication terminal, by the operation of the one-touch-dial button, a user is allowed to check whether destination data has been registered, and to determine whether or not to register destination data based on the query message.

The dial registration program may further include the steps of displaying a screen showing status of processing on a display; and in response to the output of the result of the determination and the query message, displaying on the display a screen showing selection information together with the result of the determination and the query message.

According to another aspect of the present invention, a dial registration program for a communication terminal having one or more one-touch-dial buttons is provided. The program allows an information processing unit to execute the steps of registering destination data in a destination-data registration unit; registering destination data in a one-touch-dial registration unit so as to be associated with the one or more one-touch-dial buttons; and in response to an operation of the one or more one-touch-dial buttons, allowing newly input destination data to be registered in the destination-data registration unit in a case where destination data has not been registered in the one-touch-dial registration unit and the destination-data registration unit. Accordingly, as described earlier with regard to a dial registration method for a communication terminal, it is possible to register destination data so as to be associated with the one or more one-touch-dial buttons without transition to other processing, so that the number of operations needed for registration becomes smaller.

According to another aspect of the present invention, a dial registration program for a communication terminal having one or more one-touch-dial buttons is provided. The dial registration program allows an information processing unit to execute the steps of registering destination data in a destination-data registration unit; registering destination data in a one-touch-dial registration unit so as to be associated with the one or more one-touch-dial buttons; and in response to an operation of the one or more one-touch-dial buttons, allowing destination data retrieved from the destination-data registration unit to be registered in the one-touch-dial registration unit in a case where destination data has not been registered in the one-touch-dial registration unit in relation to the one-touch-dial button operated. Accordingly, as described earlier with regard to a dial registration method for a communication terminal, it is possible to retrieve destination data from the destination-data registration unit and to register the destination data so as to be associated with the one or more one-touch-dial buttons without transition to other processing, so that the number of operations needed for registration becomes smaller.

As described above, according to the present invention, which relates to a communication terminal having one or more one-touch-dial buttons, it is possible to register destination data such as a phone number or a mail address by a sequence starting from an operation of the one or more one-touch-dial buttons for which a one-touch dial has not been registered. Thus, operations needed for registration of a phone number or the like are simplified, so that a communication terminal that is convenient and easy to operate can be provided.

Features and advantages of the present invention include the following.

With a communication terminal or a dial registration method according to the present invention, which relate to a communication terminal having one or more one-touch-dial buttons, the number of dial operations needed is reduced. Thus, the communication terminal provides improved functionality of one-touch-dial buttons and therefore improved convenience.

With a dial registration program for a communication terminal according to the present invention, which relates to a communication terminal having one or more one-touch-dial buttons, the number of dial operations needed is reduced. Thus, the communication terminal provides improved functionality of one-touch-dial buttons and therefore improved convenience.

Other objects, features, and advantages of the present invention will become more apparent from the description of embodiments with reference to the accompanying drawings.

DESCRIPTION OF THE PREFERRED EMBODIMENTS

Figure 1:
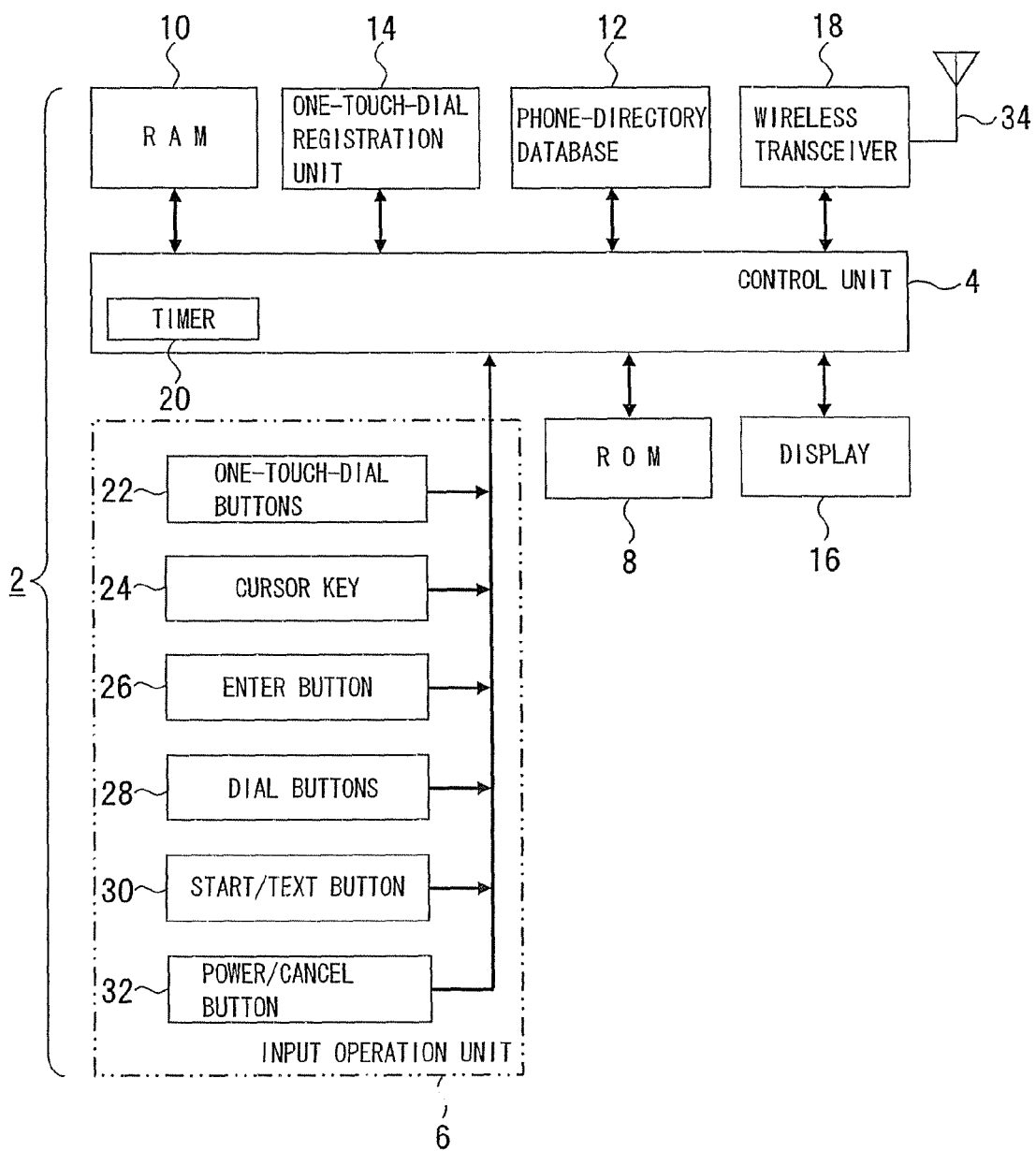
FIG. 1 is a block diagram showing an example construction of a cellular phone, which is a communication terminal according to an embodiment of the present invention.

A communication terminal according to an embodiment of the present invention will be described with reference to FIG. 1. FIG. 1 shows an example construction of a cellular phone according to an embodiment of the present invention.

Referring to FIG. 1, a cellular phone 2 includes a control unit 4 implemented by a central processing unit (CPU) or the like. The control unit 4 is connected to an input operation unit 6, a read-only memory (ROM) 8, a random access memory (RAM) 10, a phone-directory database 12, a one-touch-dial registration unit 14, a display 16, a wireless transceiver 18, and so forth.

The control unit 4 allows various types of information processing by executing programs such as a phone-number registration program, a phone-number searching program, a one-touch-dial registration program, a display control program, and a communication control program. The control unit includes a timer 20 for generating timing data. The timer 20 need not be implemented in hardware, and may be implemented in software.

The input operation unit 6 includes various switches, such as one-touch-dial buttons 22, a cursor key 24, an enter button 26, dial buttons 28, a start/text button 30, and a power/cancel button 32. The one-touch-dial buttons 22 are used to register a one-touch dial number, to make a call by one-touch dialing, or the like. The cursor key 24 is used to move a cursor displayed on a screen of the display 16. To the cursor key 24, a mail button 25 is allocated. The mail button 25 is pressed when a user wishes to enter a mail creation mode. The enter button 26 is used to determine a processing function selected by moving the cursor. The dial buttons 28 are used to input a phone number, characters, or the like. The start/text button 30 is used to make or receive phone calls, and to switch text input mode. The power/cancel button 32 is used to turn the power on or off, to terminate a call, or to hold a call.

The ROM 8 stores the programs mentioned earlier. The RAM 10 is used to temporarily store data during operation or input data. The phone-directory database 12 is an example of a destination-data registration unit that allows destination data such as phone numbers or mail addresses to be registered therein. The one-touch-dial registration unit 14 is used to register destination data, e.g., phone numbers, in relation to the one-touch-dial buttons 22. The phone numbers or other destination data are selected from the destination data registered in the phone-directory database 12. In this case, the one touch dial registration unit 14 may be constituted so that addresses in the phone directory database 12 of the destination data such as phone numbers corresponding to the one-touch-dial buttons 22 are registered therein.

The display 16 is implemented, for example, by a liquid crystal display (LCD). The display 16 is used to present information, to display a cursor for selecting information, and so forth. The wireless transceiver 18 includes a wireless unit for exchanging high-frequency signals via an antenna 34, and a baseband-signal processor for processing audio or data signals. The wireless transceiver 18 is used to exchange signals wirelessly with an operation center of phone calls, mail, or the like.

Figure 2:
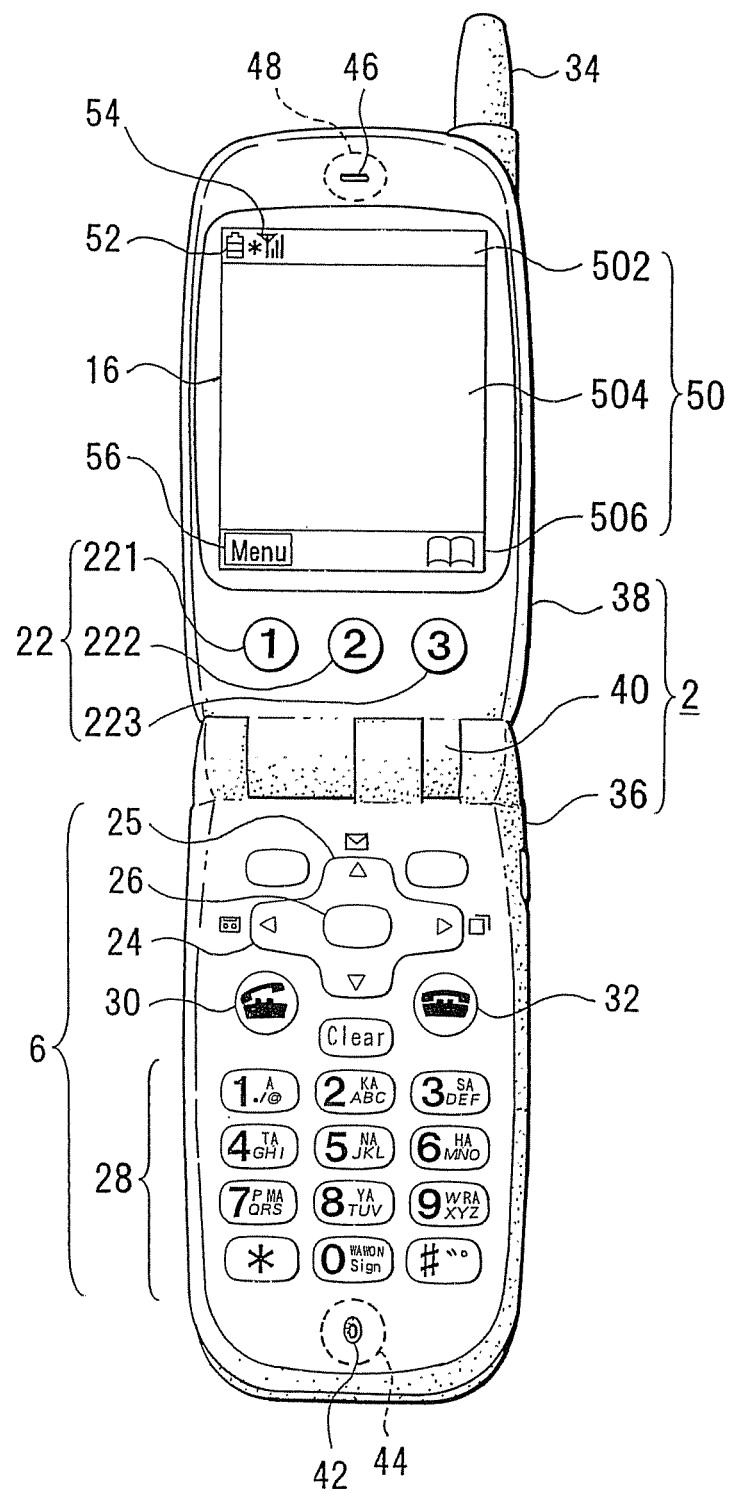
FIG. 2 is a front view showing the appearance of the cellular phone.

The appearance of the cellular phone 2 will be described with reference to FIG. 2. FIG. 2 shows an example of the appearance of the cellular phone 2.

The cellular phone 2 has a first case part 36 and a second case part 38 that can be opened or closed with respect to each other via a hinge 40. The first case part 36 is provided with the cursor key 24, the enter button 26, the dial buttons 28, the start/text button 30, the power/cancel button 32, and so forth, of the input operation unit 6. The first case part 36 also has a mouthpiece 42 from which speech is input to a microphone 44. The second case part 38 is provided with the display 16. In this embodiment, three one-touch-dial buttons 221, 222, and 223 are provided below the display 16 as the one-touch-dial buttons 22. Above the display 16, an earpiece 46 is provided, from which sound reproduced through a speaker 48 is output. The second case part 38 is also provided with an antenna 34 that can be extended or retracted. On a back surface of the second case part 38, another display is provided.

On the display 16 of the cellular phone 2, for example, an idle screen 50 is displayed. The idle screen 50 includes display areas 502, 504, and 506. The display area 502 shows a remaining-battery mark 52, a reception intensity mark 54, and so forth. The display area 504 shows, although not shown in FIG. 2, a date, a time, a preinstalled image, and the like. The display area 506 shows a menu 56.

Figure 3A:
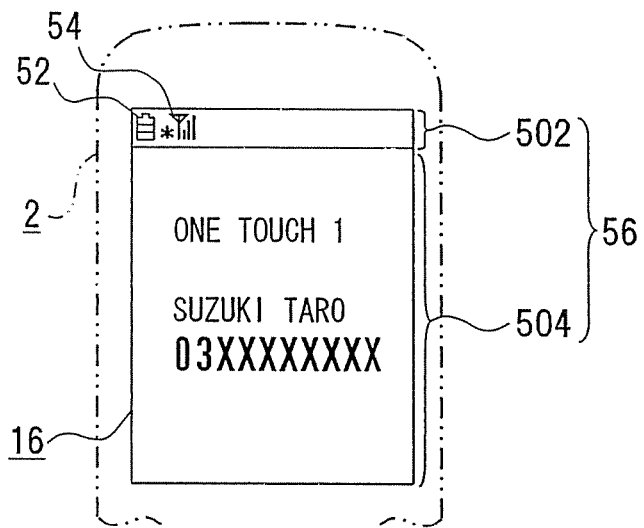
FIGS. 3A to 3C are illustrations showing example screens displayed on the cellular phone.
Figure 3B:
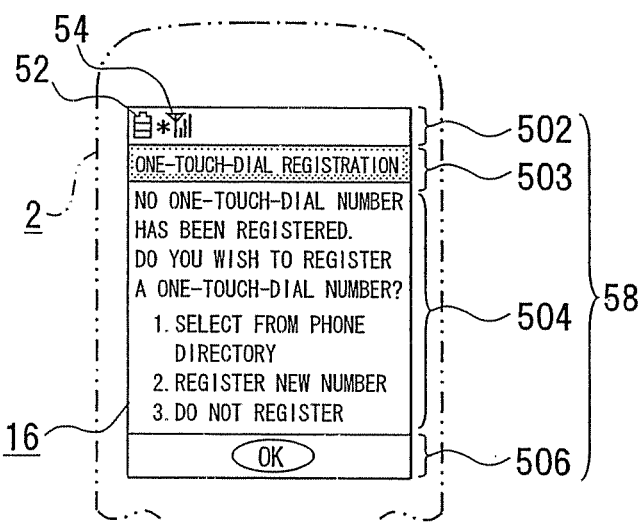
Figure 3C:
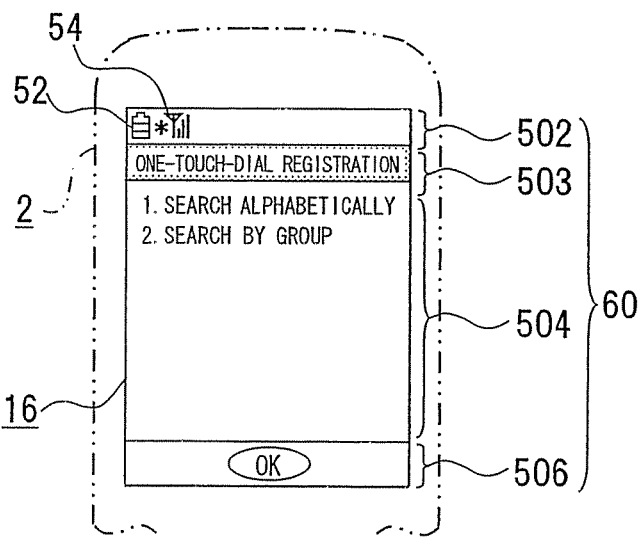
Figure 4A:
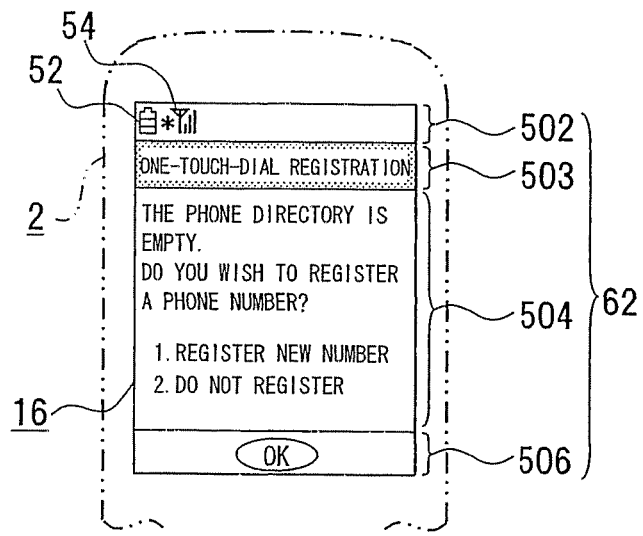
FIGS. 4A and 4B are illustrations showing example screens displayed on the cellular phone.
Figure 4B:
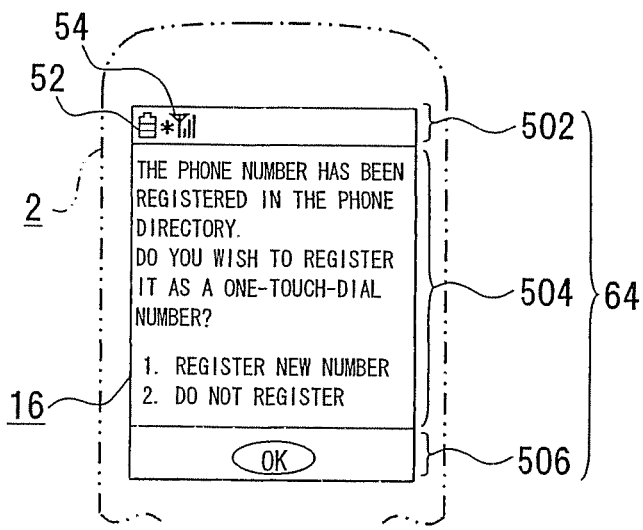

Next, screens that are displayed on the display 16 of the cellular phone 2 will be described with reference to FIGS. 3A to 3C and FIGS. 4A and 4B. FIG. 3A shows a screen displayed in a one-touch-dial mode, and FIGS. 3B and 3C show screens displayed in a one-touch-dial registration mode. FIG. 4A shows a screen displayed in the one-touch-dial registration mode, and FIG. 4B shows a screen displayed in a phone-directory registration mode.

FIG. 3A shows a screen 56 showing one-touch-dial information, which is displayed in the one-touch-dial mode. In the screen 56, the display area 502 is the same as that in the idle screen 50. The display area 504 shows "One touch 1", and a name and a phone number of a party, e.g., "SUZUKI Taro" and "03XXXXXXXX". When a mail address has been registered, the mail address is displayed in the display area 504. When the start/text button 30 is pressed while the screen 56 is displaying, the cellular phone 2 enters a phone-call mode.

FIG. 3B shows a screen 58 showing a result of searching for a registered one-touch dial number, which is displayed in the one-touch-dial registration mode. In the screen 58, display areas 502, 503, 504, and 506 are displayed. The display area 502 is the same as that in the idle screen 50. The display area 503 shows "One-touch-dial registration". The display area 504 shows a processing result and a query message, e.g., "No one-touch-dial number has been registered.", "Do you wish to register a one-touch dial number?", "1. Select from phone directory", "2. Register new number", and "3. Do not register". The display area 506 shows "OK". When the cursor is placed over one of "1. Select from phone directory", "2. Register new number", and "3. Do not register" shown in the display area 504 and the enter button 26 is pressed, the cellular phone 2 enters the selected processing.

FIG. 3C shows a screen 60 that allows searching for a registered phone number, which is displayed in the one-touch-dial registration mode. In the screen 60, the display area 502 is the same as that in the idle screen 50. The display area 503 shows "One-touch-dial registration". The display area 504 shows operation guidance, e.g., "1. Search alphabetically" and "2. Search by group". The display area 506 shows "OK". When the cursor is placed over one of "1. Search alphabetically" and "2. Search by group" shown in the display area 504 and the enter button 26 is pressed, the cellular phone 2 enters the selected processing.

FIG. 4A shows a screen 62 for choosing whether or not to register a phone number, which is displayed in the one-touch-dial registration mode. In the screen 62, the display area 502 is the same as that in the idle screen 50. The display area 503 shows "One-touch-dial registration". The display area 504 shows a processing result and a query message, e.g., "The phone directory is empty.", "Do you wish to register a phone number?", "1. Register new number", and "2. Do not register". The display area 506 shows "OK". When the cursor is placed over one of "1. Register new number" and "2. Do not register" shown in the display area 504 and the enter button 26 is pressed, the cellular phone 2 enters the selected processing.

FIG. 4B shows a screen 64 for completing registration, which is displayed in the phone-directory registration mode. In the screen 64, display areas 502, 504, and 506 are displayed. The display area 502 is the same as that in the idle screen 50. The display area 504 shows a processing result and a query message, e.g., "The phone number has been registered in the phone directory.", "Do you wish to register it as a one-touch-dial number?", "1. Register new number", and "2. Do not register". The display area 506 shows "OK". When the cursor is placed over one of "1. Register new number" and "2. Do not register" displayed on the display area 504 and the enter button 26 is pressed, the cellular phone 2 enters the selected processing.

Figure 5:
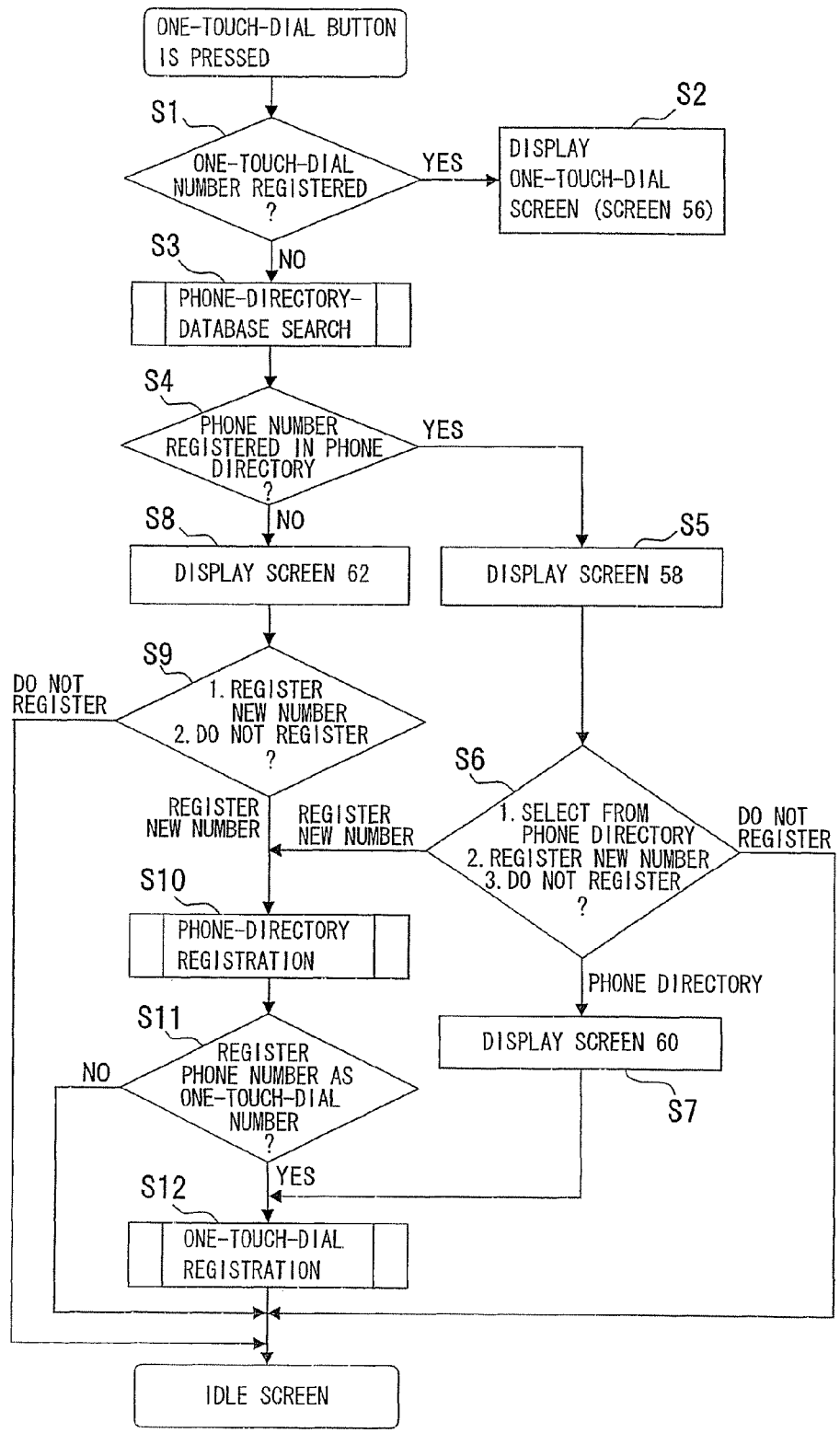
FIG. 5 is a flowchart showing a processing procedure of a dial registration method and a dial registration program for a communication terminal according to an embodiment of the present invention.
Figure 6:
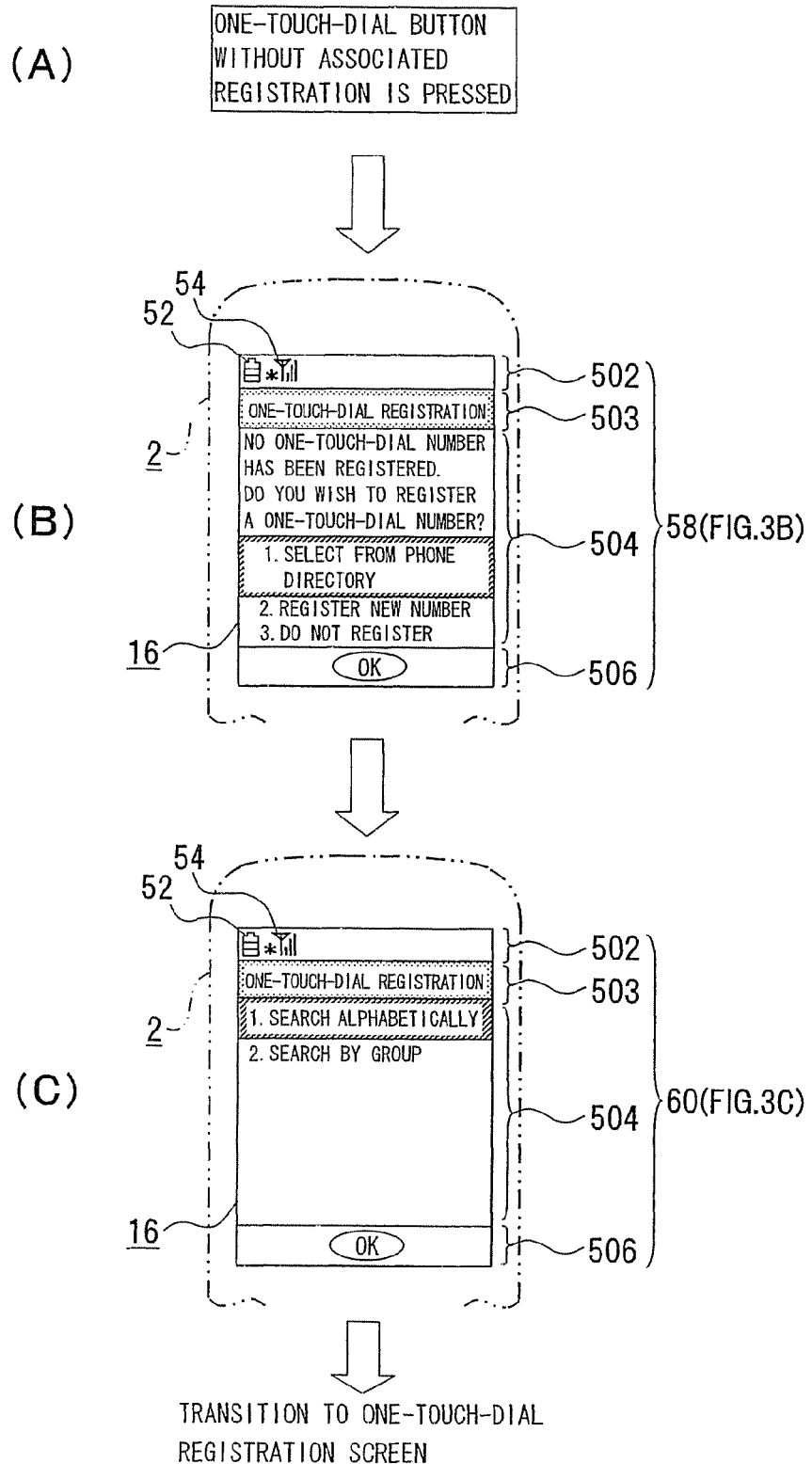
FIG. 6 is an illustration of a screen for registering a one-touch-dial number that is not yet registered.
Figure 7:
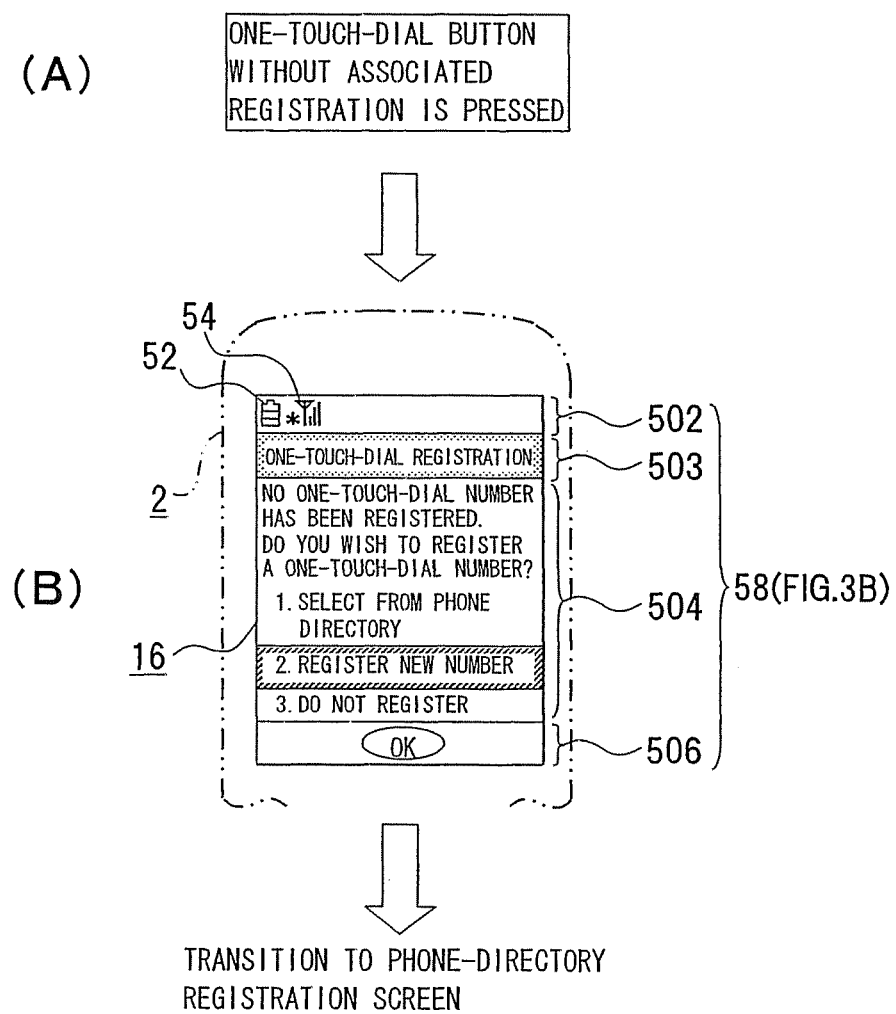
FIG. 7 is an illustration of a screen for registering a one-touch-dial number that is not yet registered.
Figure 8:
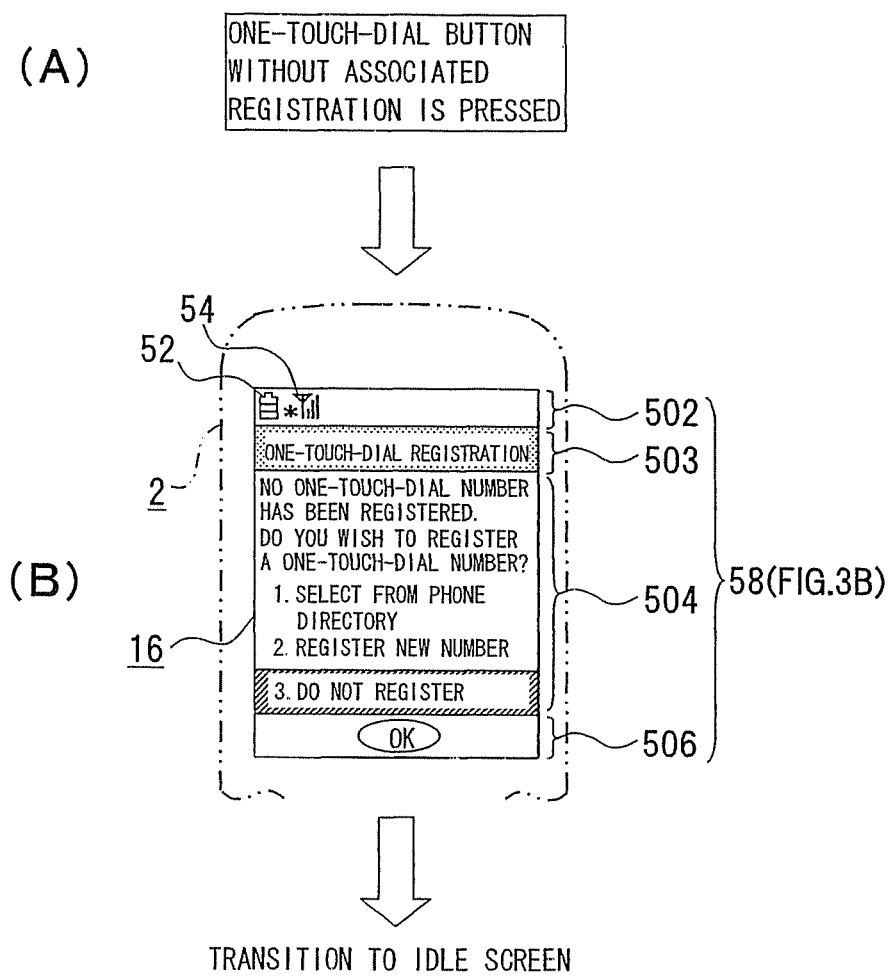
FIG. 8 is an illustration of a screen that is displayed in a case where a one-touch-dial number is not registered.
Figure 9:
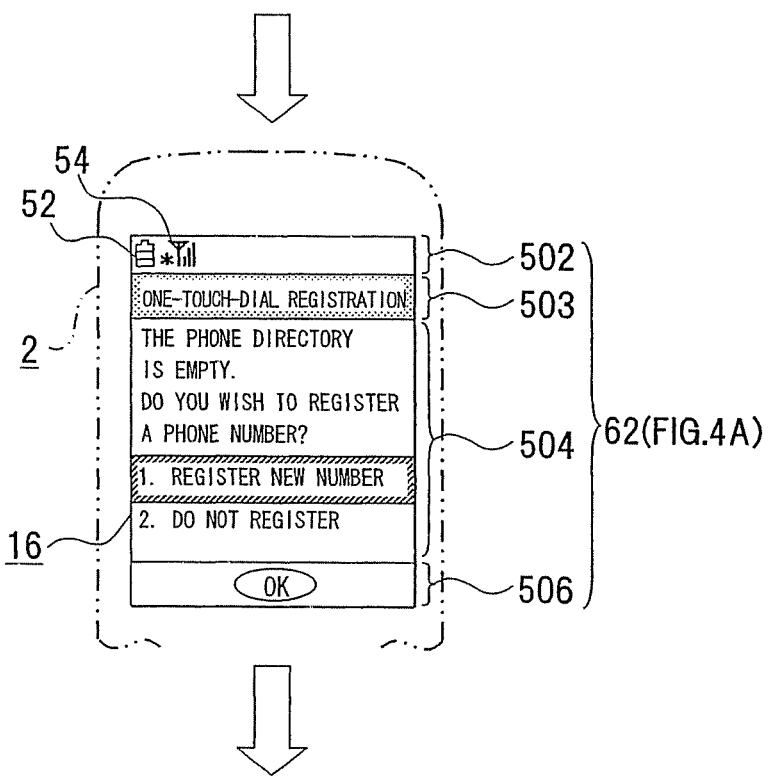
FIG. 9 is an illustration of a screen for registering a one-touch-dial number that is not yet registered.

Next, a dial registration method and a dial registration program for a communication terminal according to an embodiment of the present invention will be described with reference to FIGS. 5 to 9. FIG. 5 is a flowchart showing a processing procedure of a one-touch-dial registration method or a one-touch-dial registration program for a cellular phone. FIGS. 6 to 9 relates to processing in response to an operation of a one-touch-dial button without associated registration. FIG. 6 shows transition of a screen in a case where an entry exists in a phone directory and a one-touch-dial number is registered by retrieving the entry. FIG. 7 shows transition of a screen in a case where an entry exists in a phone directory and a new one-touch-dial number is registered. FIG. 8 shows transition of a screen in a case where an entry exists in a phone directory and a one-touch-dial number is not registered. FIG. 9 shows transition of a screen in a case where an entry does not exist in a phone directory and a new one-touch-dial number is registered. A program for the processing procedure in the flowchart shown in FIG. 5 is usually stored in the ROM 10, but may be stored in a storage medium other than the ROM 10.

When one of the one-touch-dial buttons 221, 222, and 223 is pressed, the cellular phone 2 enters the one-touch-dial mode. Then, in step S1, it is determined whether a one-touchdial number has been registered for the one-touch-dial button pressed. More specifically, when one of the one-touch-dial buttons 221 to 223 is pressed, it is checked whether a phone number has been allocated to an address associated with the one-touch-dial button pressed. As a result of this determination, if, for example, the one-touch-dial button 221 is pressed, in step S2, the screen 56 shown in FIG. 3A is displayed. In the screen 56, "One touch 1" representing the one-touch-dial button 221, a name of a party, e.g., "SUZUKI Taro", and a phone number of the party, e.g., "03XXXXXXXX", are displayed. Thus, a user is allowed to find out the party and the phone number registered for the one-touch-dial button 221.

When no one-touch-dial number has been registered, in step S3, the phone-directory database 12 is searched. In step S4, it is determined whether phone numbers have been registered in the phone-directory database 12 based on the searching in step S3. When phone numbers have been registered in the phone-directory database 12, in step S5, the cellular phone 2 enters the one-touch-dial registration mode, and the screen 58 shown in FIG. 3B is displayed. Then, in step S6, selection instructions about whether to choose a phone number from the phone-directory database 12, to register a new one-touch-dial number, or not to register are displayed. When the user selects not to register, the screen transits to the idle screen 50 shown in FIG. 2. When the user selects to choose a phone number from the phone-directory database 12, in step S7, the screen 60 shown in FIG. 3C is displayed. When the user selects to register a new one-touch-dial number, the cellular phone 2 enters the phone-directory registration mode.

When it is determined in step S4 that no phone number has been registered in the phone-directory database 12, in step S8, the screen 62 shown in FIG. 4A is displayed. In step S9, the user selects whether or not to register a new one-touch-dial number in the screen 62. When the user selects not to register a one-touch-dial number, the cellular phone 2 exits the procedure, and returns to the idle screen 50 shown in FIG. 2 and described earlier. When the user selects to register a new one-touch-dial number, in step S10, the cellular phone 2 enters the phone-directory registration mode so that the user is allowed to input a phone number or the like using the dial buttons 28. When the input is completed, in step S1, it is determined whether or not to register the phone number as a one-touch-dial number. In this case, the screen 64 shown in FIG. 4B is displayed. When the user selects not to register a one-touch-dial number, the cellular phone 2 returns to the idle screen 50 shown in FIG. 2. On the other hand, when the user selects to register a one-touch-dial number, in step S12, the user presses the enter button 26 in the screen 64 to register a one-touch-dial number. When the phone number has been registered as associated with the pressed button among the one-touch-dial buttons 221 to 223, the cellular phone 2 returns to the idle screen 50 shown in FIG. 2.

In the processing procedure described above, when no one-touch-dial number has been registered and a one-touch-dial number is registered from the phone-directory database 12 in which phone-number data exists, Screen shown in parts (A), (B), and (C) of FIG. 6 is displayed and processing is executed in accordance with the transition of the screen. When one of the one-touch-dial buttons 221 to 223 without associated registration is pressed, the screen 58 shown in FIG. 3B is displayed, and when a phone number is to be selected from the phone-directory database 12, the screen 60 shown in FIG. 3C is displayed. Then, when, a one-touch-dial number is to be registered, a one-touch-dial registration screen is displayed and the one-touch-dial number is registered, whereby registration of the one-touch-dial number is completed.

When no one-touch-dial number has been registered and a new phone number is registered in the phone-directory database 12 in which phone-number data exists, screen shown in parts (A) and (B) of FIG. 7 is displayed and processing is executed in accordance with the transition of the screen. That is, when one of the one-touch-dial buttons 221 to 223 without associated registration is pressed, the screen 58 shown in FIG. 3B is displayed. When the user selects to register a new one-touch-dial number, the screen transits to a phone-directory registration screen.

Since a phone number can be directly registered in the phone-directory database 12 from the one-touch-dial registration mode, the number of button operations needed is small, and a phone number and a one-touch-dial number can be registered continuously.

If phone-number data exists in the phone-directory database 12 and no one-touch-dial number has been registered, when the user selects not to register a one-touch-dial number, screen shown in parts (A) and (B) of FIG. 8 is displayed and processing is executed in accordance with the transition of the screen. When one of the one-touch-dial buttons 221 to 223 without associated registration is pressed, the screen 58 shown in FIG. 3B is displayed. When the user selects not to register a phone number, the one-touch-dial registration mode is exited, and the screen transits to the idle screen 50 shown in FIG. 2.

When a phone number has not been registered in the phone-directory database 12 and a new phone number is to be registered from the one-touch-dial registration mode, screen shown in parts (A) and (B) of FIG. 9 is displayed and processing is executed in accordance with the transition of the screen. When one of the one-touch-dial buttons 221 to 223 without associated registration is pressed, the screen 62 shown in FIG. 4A is displayed. When the user selects to register a new phone number, the screen transits to the phone-directory registration screen.

Also in this case, a phone number can be registered in the phone-directory database 12 directly from the one-touch-dial registration mode, so that the number of button operations needed is small, and a phone number and a one-touch-dial number can be registered continuously.

Figure 10:
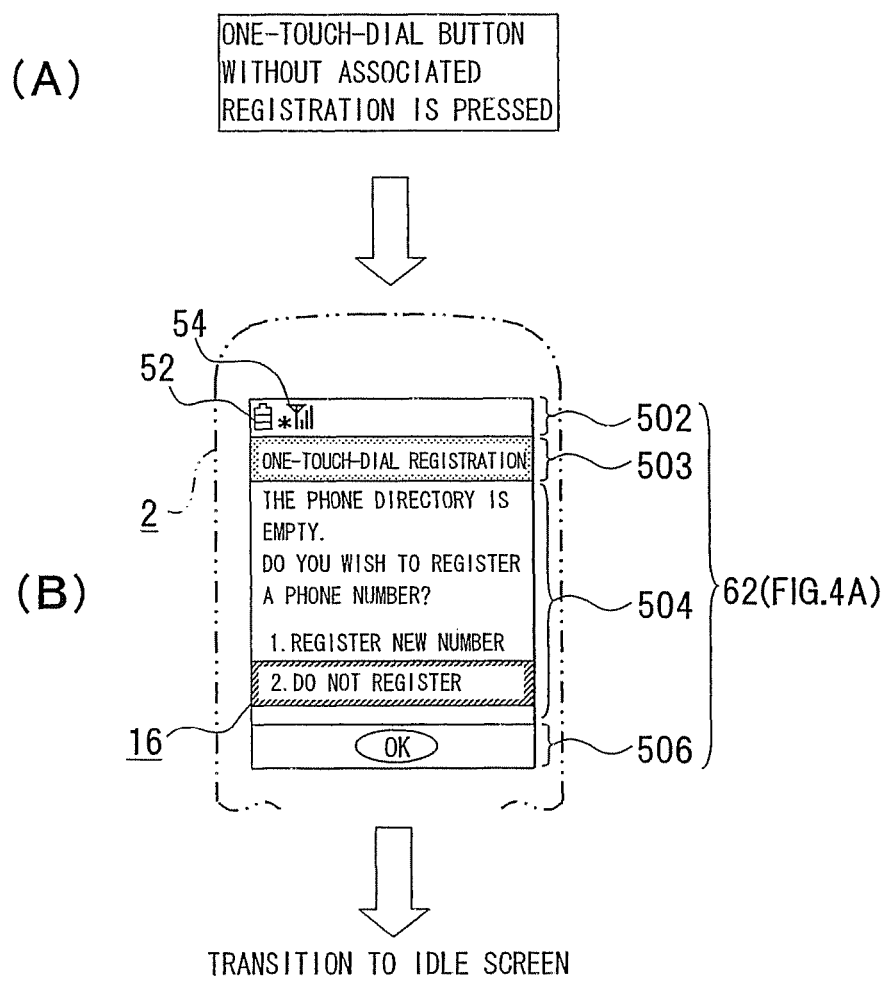
FIG. 10 is an illustration of a screen for registering a one-touch-dial number that is not yet registered.

When a phone number has not been registered in the phone-directory database 12 and a new phone number is not registered in the one-touch-dial registration mode, screen shown in parts (A) and (B) of FIG. 10 is displayed and processing is executed in accordance with the transition of the screen. When one of the one-touch-dial buttons 221 to 223 without associated registration is pressed, the screen 62 shown in FIG. 4A is displayed. When the user selects not to register a phone number, the screen transits to the idle screen 50 shown in FIG. 2.

Figure 11:
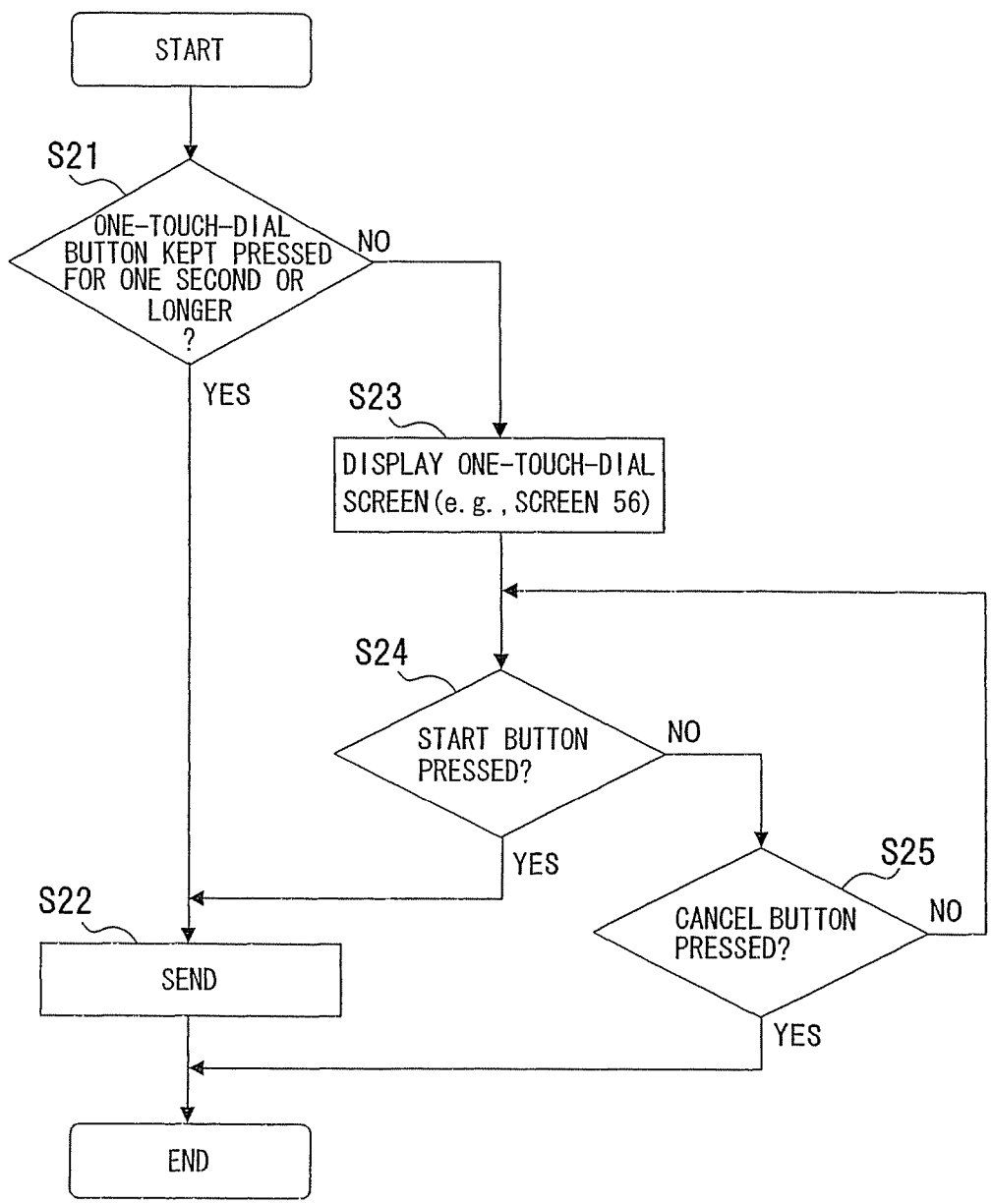
FIG. 11 is a flowchart showing a processing procedure of a sending method or a sending program that uses a one-touch-dial number.
Figure 12:
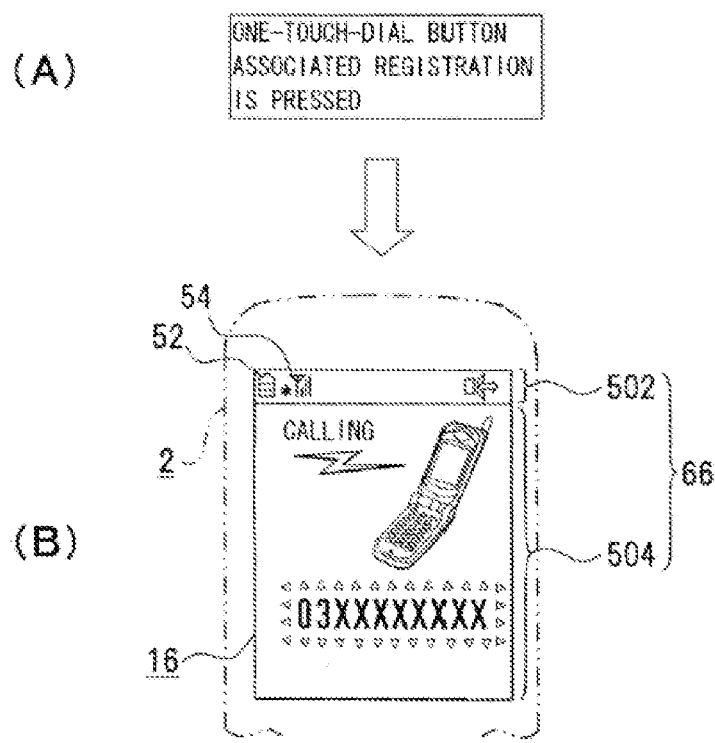
FIG. 12 is an illustration of a screen that is displayed in a one-touch-dial sending process.

Next, a sending method or a sending program relating to one-touch dialing in the cellular phone 2 will be described with reference to FIGS. 11 and 12. FIG. 11 is a flowchart showing a sending procedure relating to an operation of a one-touch-dial button. FIG. 12 is an illustration showing transition of screen relating to the procedure.

When phone numbers have been registered for the one-touch-dial buttons 221, 222, and 223 in the cellular phone 2, when one of the one-touch-dial buttons 221, 222, and 223, e.g., the one-touch-dial button 221, is pressed, in step S21, it is determined whether the one-touch-dial button 221 is kept pressed for a predetermined time, e.g., one second, or longer than the predetermined time. If so, a sending process is executed. Thus, only by pressing the one-touch-dial button 221 without using other buttons, it is possible to call a phone number assigned to the one-touch-dial button 221 and conversation is allowed.

When the one-touch-dial button 221 is not kept pressed for one second, in step S23, a one-touch-dial screen, i.e., the screen 56 shown in FIG. 3A, is displayed. In this case, phone-number data associated with the one-touch-dial button 221, i.e., "One touch 1", a name of a party, e.g., "SUZUKI Taro", and a phone number of the party, e.g., "03XXXXXXXX", are displayed.

In the screen 56, when the mail button 25 allocated to the cursor key 24 is pressed, a mail creating screen is displayed on the display 16, allowing the user to create a mail by inputting text using the dial buttons 28. When the user finishes creating a mail and accepts the content of the mail by pressing the enter button 26 and then presses the start/text button 30, the mail is sent to a party registered as associated with the one-touch-dial button 221.

While the one-touch-dial screen is displaying, in step S24, it is determined whether the start/text button 30 is pressed. If so, in step S22, the cellular phone 2 enters a sending process. If the power/cancel button 32 is pressed without pressing the start/text button 30, the cellular phone 2 exits the sending mode and returns to the idle screen 50 shown in FIG. 2.

In the sending process in response to pressing of one of the one-touch-dial buttons 221, 222, and 223, the screen transits to the screen shown in parts (A) and (B) of FIG. 12. More specifically, when one of the one-touch-dial buttons 221, 222, and 223 is pressed, a sending process is executed. In the sending process, as shown in part (B) of FIG. 12, a screen 66 is displayed on the display 16. In the screen 66, display areas 502 and 504 are displayed. The display area 502 shows a remaining-battery mark 52, a reception-intensity mark 54, and so forth. The display area 504 shows "Calling" and the destination phone number, e.g., "03XXXXXXXX", together with an image of a cellular phone.

As described above, when phone numbers have been registered for the one-touch-dial buttons 221, 222, and 223, it is possible to call and communicate with a registered party by pressing one of the one-touch-dial buttons 221, 222, and 223.

Features, modifications, etc., of the embodiment described above will be given below.

(1) As in the embodiment described above, from a one-touch-dial screen, it is possible to input a phone number or a mail address, perform control processing of edit and registration of destination data, such as a name of a party, and to retrieve registered destination data, e.g., a phone number, from a phone-directory database and register it as a one-touch-dial number. Thus, the number of button operations and amount of processing needed are reduced. Furthermore, it is possible to register a phone number even when a user is not allowed to instantly refer to the phone number.

(2) For a user who appreciates ease of operation, it is possible to provide a communication terminal, e.g., a cellular phone, that is convenient in that it is easy to operate, easy to learn to operate, and easy to use.

(3) Furthermore, in a screen for registration of a one-touch-dial number, when phone numbers have not been registered, a message to that effect and a message for registration are displayed. Thus, it is possible to provide a communication terminal, e.g., a cellular phone, that provides rich guidance.

(4) Although a cellular phone is described as an example of a communication terminal in the embodiment, the present invention is not limited to the embodiment, and may be applied to a personal digital assistant (PDA), a personal computer, a digital camera, or the like, that is capable of communication.

(5) Although phone numbers and mail addresses are mentioned as examples of destination data that is registered in the embodiment described above, other destination data may be used.

(6) Although three one-touch-dial buttons are used in the embodiment described above, four or more one-touch-dial buttons may be provided. Also, four or more one-touch-dial numbers may be registered using combinations of two or more buttons among three one-touch-dial buttons.

Although a preferred embodiment, modifications, etc., of the present invention have been described above, the present invention is not limited to what has been described above. Various modifications and alternatives could be conceived by those skilled in the art based on the gist of the present invention as described in the claims or disclosed in the specification. It is to be understood that such modifications and alternatives fall within the scope of the present invention.

The entire disclosure of Japanese Patent Application No. 2004-238520 including specification, claims, drawings and abstract is incorporated herein by reference in its entirety.

What is claimed is:

1. A communication terminal having one or more one-touch-dial buttons, the communication terminal comprising:
   a one-touch-dial registration unit that allows destination data to be registered therein so as to be associated with the one or more one-touch-dial buttons;
   a display that displays a screen showing a one-touch-dial registration;
   a control unit that, in response to an operation of a one-touch-dial button of the one or more one-touch-dial buttons, makes destination data register in the one-touch-dial registration unit so as to be associated with the one-touch-dial button operated, based on a selection of the one-touch-dial registration from the screen showing the one-touch-dial registration on the display, in a case where destination data has not been registered in the one-touch-dial registration unit in relation to the one-touch-dial button operated.

2. The communication terminal according to claim 1, wherein the display displays the screen showing selection information of the one-touch-dial registration in a case where destination data has not been registered in the one-touch-dial registration unit.

3. A dial registration method for a communication terminal having one or more one-touch-dial buttons, the dial registration method comprising the steps of:
   registering destination data in a one-touch-dial registration unit so as to be associated with the one or more one-touch-dial buttons; and
   in response to an operation of a one-touch-dial button of the one or more one-touch-dial buttons, making destination data register in the one-touch-dial registration unit so as to be associated with the one-touch-dial button operated, based on a selection of the one-touch-dial registration from a screen showing the one-touch-dial registration, in a case where destination data has not been registered in the one-touch-dial registration unit in relation to the one-touch-dial button operated.

4. A dial registration program for a communication terminal having one or more one-touch-dial buttons, the dial registration program allowing an information processing unit to execute the steps of:
   registering destination data in a one-touch-dial registration unit so as to be associated with the one or more one-touch-dial buttons; and
   in response to an operation of a one-touch-dial button of the one or more one-touch-dial buttons, making destination data register in the one-touch-dial registration unit so as to be associated with the one-touch-dial button operated, based on a selection of the one-touch-dial registration from a screen showing the one-touch-dial registration, in a case where destination data has not been registered in the one-touch-dial registration unit in relation to the one-touch-dial button operated.

* * * * *